US010333367B2

(12) United States Patent
Lien

(10) Patent No.: US 10,333,367 B2
(45) Date of Patent: Jun. 25, 2019

(54) PLANAR ENERGY CONVERSION DEVICE

(71) Applicant: SPEEDY CIRCUITS CO., LTD., Taipei (TW)

(72) Inventor: Ching Chung Lien, Taipei (TW)

(73) Assignee: SPEEDY CIRCUITS CO., LTD., Taipei (TW)

( * ) Notice: Subject to any disclaimer, the term of this patent is extended or adjusted under 35 U.S.C. 154(b) by 374 days.

(21) Appl. No.: 15/112,421

(22) PCT Filed: Jun. 24, 2014

(86) PCT No.: PCT/CN2014/080624
§ 371 (c)(1),
(2) Date: Jul. 18, 2016

(87) PCT Pub. No.: WO2015/106541
PCT Pub. Date: Jul. 23, 2015

(65) Prior Publication Data
US 2016/0336830 A1    Nov. 17, 2016

Related U.S. Application Data

(60) Provisional application No. 61/929,472, filed on Jan. 20, 2014.

(51) Int. Cl.
*H02K 7/20* (2006.01)
*H02K 5/04* (2006.01)
(Continued)

(52) U.S. Cl.
CPC .............. *H02K 5/04* (2013.01); *H02K 1/02* (2013.01); *H02K 1/27* (2013.01); *H02K 3/26* (2013.01);
(Continued)

(58) Field of Classification Search
CPC .............. H02K 1/02; H02K 5/04; H02K 3/26
(Continued)

(56) References Cited

U.S. PATENT DOCUMENTS 7,298,063 B2 * 11/2007 Cunningham ......... H02K 1/182
310/112
2006/0198728 A1    9/2006 Fujimoto et al.
(Continued)

FOREIGN PATENT DOCUMENTS

CN      2854915      1/2007
CN      101714805    5/2010
(Continued)

*Primary Examiner* — Hanh N Nguyen
(74) *Attorney, Agent, or Firm* — Liu & Liu

(57) ABSTRACT

A planar energy conversion device with a plurality of micro-conversion units is provided and includes a carrier. The carrier includes a plurality of cavities arranged horizontally. The cavities correspond in position to the micro-conversion units, respectively. Each micro-conversion unit includes: a magnetic rotor disposed in the corresponding cavity; and at least one ring-shaped stator surrounding the magnetic rotor, the magnetic rotor being integrated into the carrier and including a magnet component and a winding unit. The magnet component has multiple protruding portions horizontally arranged along the edge of the corresponding cavity. The winding unit has multiple winding elements corresponding in position to the protruding portions, respectively.

18 Claims, 8 Drawing Sheets

(51) Int. Cl.
*H02K 3/26* (2006.01)
*H02K 1/02* (2006.01)
*H02K 1/27* (2006.01)
*H02K 21/16* (2006.01)
*H02K 16/00* (2006.01)
*H02K 3/28* (2006.01)

(52) U.S. Cl.
CPC ............ *H02K 16/00* (2013.01); *H02K 21/16* (2013.01); *H02K 3/28* (2013.01); *H02K 2213/12* (2013.01)

(58) Field of Classification Search
USPC .......................................... 310/112, 113, 114
See application file for complete search history.

(56) References Cited

U.S. PATENT DOCUMENTS

| 2008/0012441 | A1* | 1/2008 | Yang ...................... H02K 7/116 |
| | | | 310/112 |
| 2008/0231132 | A1* | 9/2008 | Minowa ................ H02K 16/00 |
| | | | 310/114 |
| 2010/0084937 | A1 | 4/2010 | Horst |
| 2010/0156221 | A1* | 6/2010 | Dooley ................. H02K 7/116 |
| | | | 310/114 |

FOREIGN PATENT DOCUMENTS

| CN | 101741151 | 6/2010 |
| IT | 1147853 | 11/1986 |
| JP | 2012-78238 | 4/2012 |

\* cited by examiner

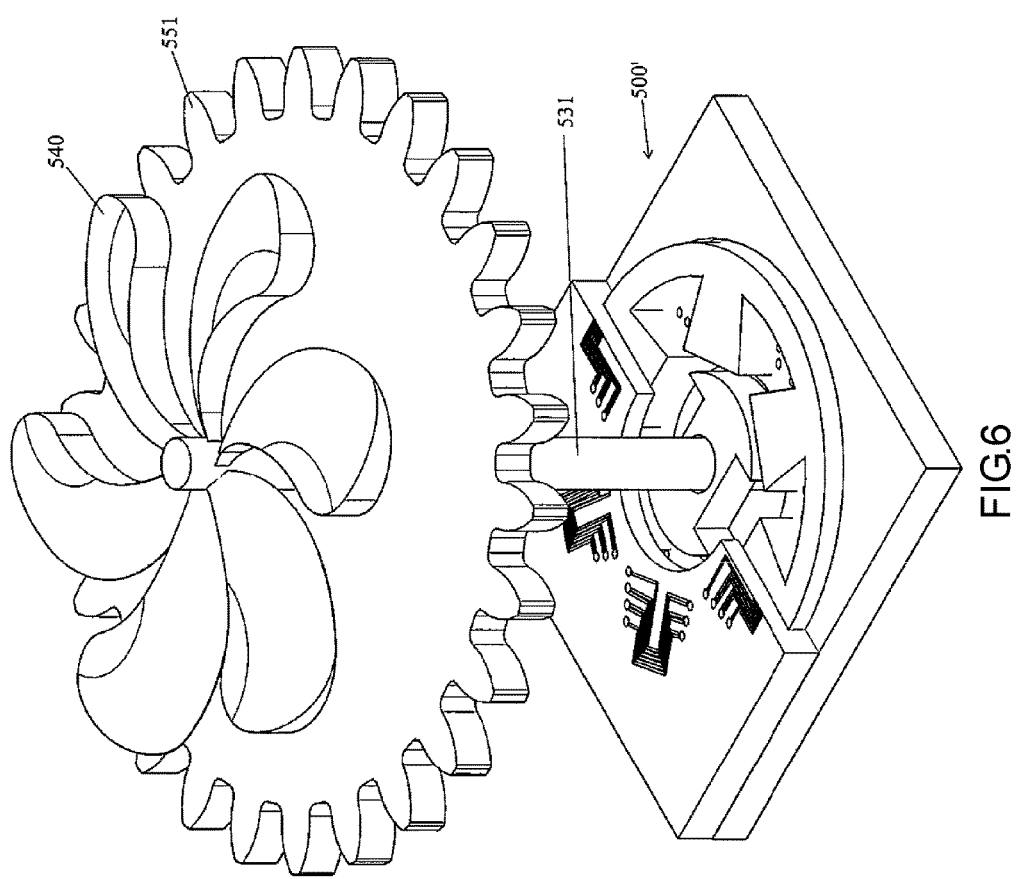

PLANAR ENERGY CONVERSION DEVICE

BACKGROUND OF THE INVENTION

Field of the Invention

The present invention relates to planar energy conversion devices and, more particularly, to a planar energy conversion device with a magnetic rotor and a stator.

Description of the Prior Art

Conventional energy conversion devices are mainly used in large-scale facilities; however, they cannot operate in the arena of the daily life of the man in the street, nor do they meet the needs of the general public in the particulars of a life. Take energy conversion devices (i.e., electric generators), which convert mechanical energy into electrical energy, as an example, they mostly operate in places inaccessible to populations, and the power they generate is supplied to specific locations through a cable transmission system. Therefore, power supply is usually location-dependent. With various portable electronic products being popular, more and more people look forward to flexible power supply, and especially want to be least restricted to a fixed location connected to a large-scale electric generator.

SUMMARY OF THE INVENTION

In view of the aforesaid drawbacks of the prior art, it is an objective of the present invention to provide a planar energy conversion device which can be downsized and made lightweight. The planar energy conversion device of the present invention is obtained by dividing a conventional energy conversion device into thin segments to form a plurality of micro-conversion units. Each micro-conversion unit can operate independently to effectuate energy conversion. The planar energy conversion device of the present invention includes an electric generator which converts mechanical energy into electrical energy, an electric motor which converts electrical energy into mechanical energy, and any other device which uses components disclosed in the present invention to effectuate energy conversion.

The planar energy conversion device of the present invention has a planar carrier and a plurality of micro-conversion units. In a preferred embodiment, the planar carrier is a planar circuit board. The micro-conversion units are arranged in a planar circuit board horizontally by circuit board technology. Components, such as a ring-shaped stator, a magnetic rotor and a coil, required by each micro-conversion unit are miniaturized and sophisticatedly designed so as to be integrated into the circuit board.

The planar energy conversion device of the present invention can be designed to be an electric generator for converting mechanical energy into electrical energy. The electric generator generates power at any place through any mechanical driving means, whether by hand or by any fluid, such as water, wind or any appropriate driving force. In the case of generating power by a fluid, the present invention provides miniaturized vanes or microvanes having permanent magnetism. A tiny fluid exerts a force upon the vanes to drive a rotor to rotate and generate micro-power, thereby generating power at anywhere. To harness hydropower, the rotor operates in conjunction with a rotating disk that works like a water wheel of a watermill. The planar energy conversion device of the present invention is capable of generating micro-power of microwatt-scale or above, and power at this level supplements the power source of batteries required to detect and sense a component in interconnected networks.

Electric generators differ from electric motors in a basic principle, that is, opposite directions of energy conversion. Therefore, the planar energy conversion device of the present invention can also be designed to be an electric motor for converting electrical energy into mechanical energy.

The present invention further includes the other embodiments to solve the other problems. The aforesaid and other embodiments are described in detail below.

BRIEF DESCRIPTION OF THE DRAWINGS

FIG. 6 is another cutaway view of part of the structure of the planar energy conversion device according to the fourth embodiment of the present invention.

DETAILED DESCRIPTION OF THE EMBODIMENTS

Figure 1A:
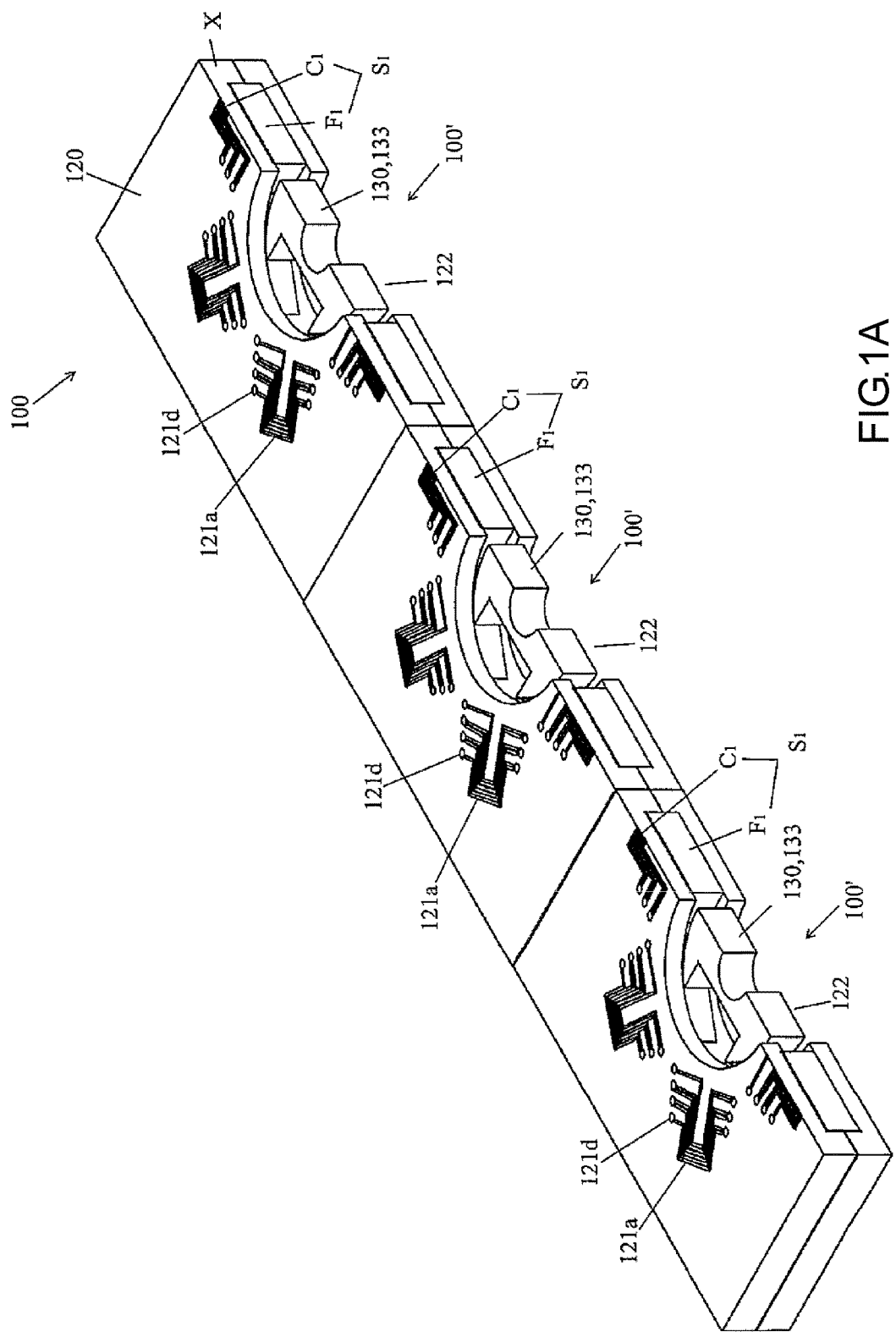
FIG. 1A is a cutaway view of part of the structure of a planar energy conversion device according to the first embodiment of the present invention.

Preferred embodiments of the present invention are illustrated by accompanying drawings and described below. Like components shown in the accompanying drawings are denoted with identical reference numerals. To present the present invention clearly, the accompanying drawings are not drawn to scale. To focus on the contents of the present invention, the description below omits conventional principles, parts and components, related materials, and related processing techniques.

Figure 1B:
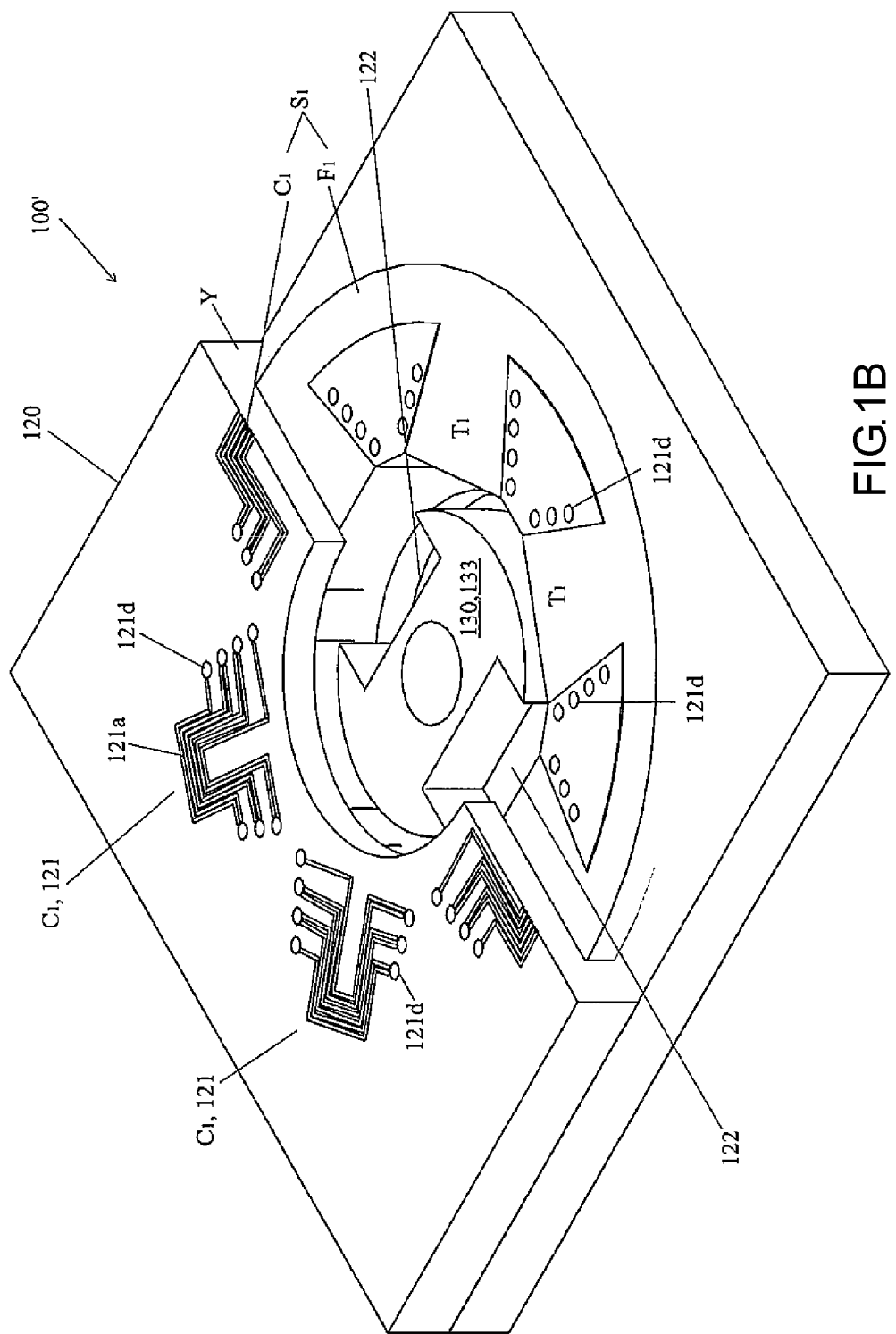
FIG. 1B is a cutaway view of part of the structure of a single micro-conversion unit according to the first embodiment of the present invention.
Figure 2:
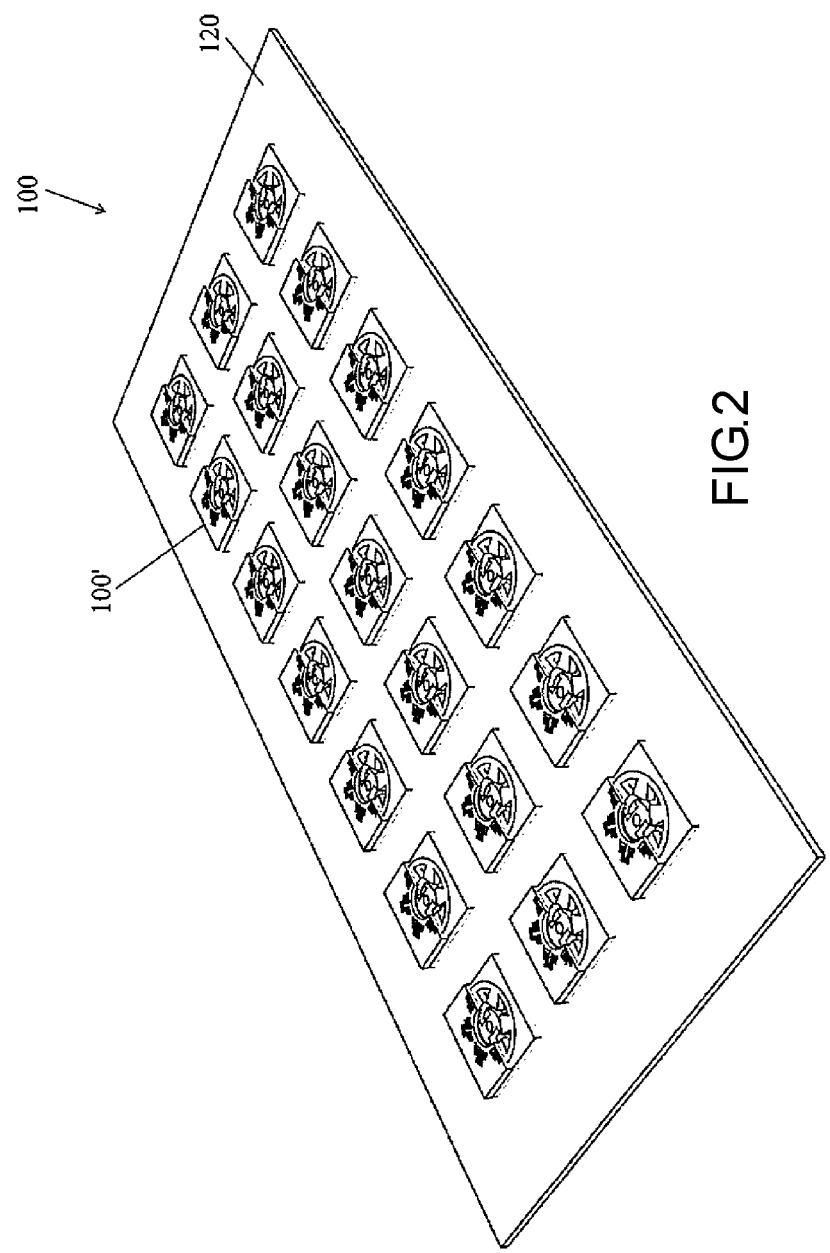
FIG. 2 is a top view of a circuit board of the planar energy conversion device according to the first embodiment of the present invention.

In the first embodiment, the planar energy conversion device comprises a casing (not shown) and a circuit board 120 which is disposed in the casing to function as a carrier. FIG. 1A, FIG. 1B and FIG. 2 each show part of the structure of a planar energy conversion device 100 of the first embodiment. The planar energy conversion device 100 comprises a plurality of micro-conversion units 100'. FIG. 1A is a cutaway view of three micro-conversion units 100'. FIG. 1A shows only a half of the structure when taken along cross section X and thus does not show the other symmetric half of the structure. FIG. 1B is a cutaway view of a single micro-conversion unit 100' taken along cross section Y which defines two symmetric halves; to show clearly components otherwise hidden in the circuit board 120, the diagram omits winding elements and insulating layers of part of the circuit board of the right half of the structure taken along cross section Y. FIG. 2 is a perspective view of the circuit board 120 with 21 micro-conversion units 100' arranged in a 3×7 matrix; to show clearly components otherwise hidden in the circuit board 120, the diagram omits winding elements and/or surface insulating layers of part of the circuit board of each micro-conversion unit 100'. The aforesaid embodiments of the present invention are not restrictive of the quantity of the micro-conversion units 100' of the planar energy conversion device 100.

Referring to FIG. 1A and FIG. 1B, the circuit board 120 has a plurality of horizontally arranged cavities 122 corresponding in position to the micro-conversion units 100', respectively. The micro-conversion units 100' each comprise: a magnetic rotor 130 disposed in a corresponding one of the cavities 122; and a ring-shaped stator S1 integrated into the circuit board 120 to surround the magnetic rotor 130 horizontally. The ring-shaped stator S1 comprises a magnet component F1 and a winding unit C1. Referring to FIG. 2, preferably, the ring-shaped stator S1 is partly or fully embedded in the circuit board 120. The magnet component F1 has multiple protruding portions T1 arranged along the edge of the cavity 122 horizontally. The winding unit C1 has multiple winding elements 121 which correspond in position to the protruding portions T1, respectively. In this embodiment, the winding elements 121 wind around the protruding portions T1 corresponding in position to the winding elements 121, respectively. The way the winding elements 121 wind is subject to changes as needed. For example, in this embodiment, the winding elements 121 each comprise an upper wiring layer 121a and a lower wiring layer (not shown) which are formed on the circuit board 120 and multiple conductive through holes 121d which penetrate the circuit board 120 to connect the upper wiring layers 121a and the lower wiring layers, so as for the winding elements 121 to wind around the magnet components F1. FIG. 1B is merely illustrative of wiring patterns of the upper wiring layer, and thus the present invention is not limited thereto. In a variant embodiment, the wiring patterns of the upper wiring layer take any other appropriate form.

Figure 1C:
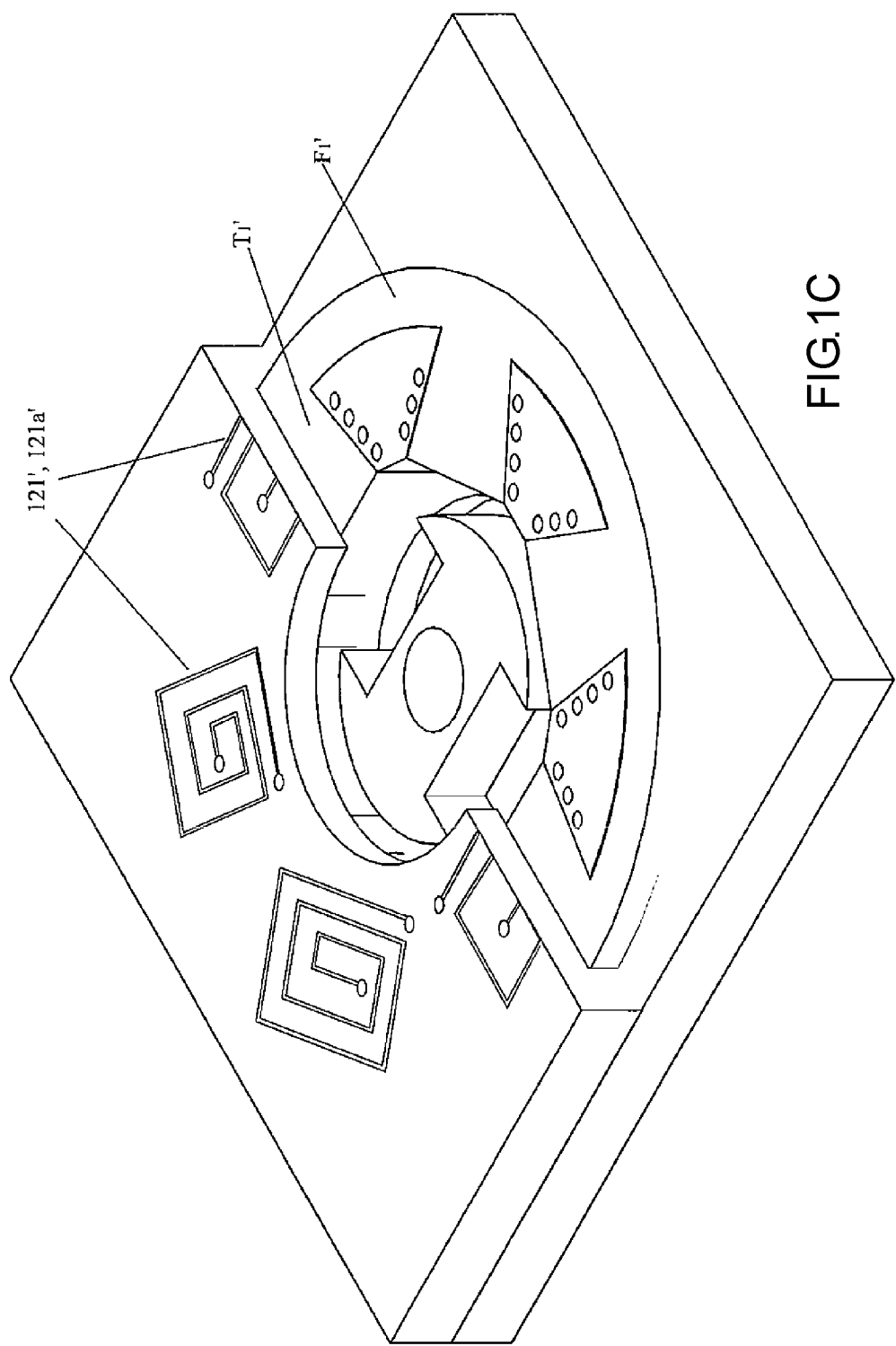
FIG. 1C is a cutaway view of part of the structure of the single micro-conversion unit according to another embodiment of the present invention.

In a variant embodiment of the present invention, the micro-conversion units 100' each further comprise winding elements corresponding in position to the protruding portions, respectively, without winding around the protruding portions, respectively. For example, in the embodiment shown in FIG. 1C, clip like spiral wiring patterns are formed on a plane which upper wiring layers 121a' of winding elements 121' lies on. The upper wiring layers 121a' are positioned proximate to protruding portions T1' of magnet components F1' corresponding in position to the upper wiring layers 121a' and have spiral wirings, thereby generating an induced current. As mentioned before, the winding elements 121 shown in FIG. 1B wind around the magnet components F1 through the upper wiring layers 121a, lower wiring layers and conductive through holes 121d. By contrast, the winding elements 121' shown in FIG. 1C do not wind around the protruding portions T1' corresponding in position to the winding elements 121'.

The casing of the planar energy conversion device 100 is made of a conventional industrial plastic or any other appropriate material, whereas its size and shape are subject to changes as needed. The circuit board 120, with its skeleton being a casing, is built-in. The circuit board of the present invention has its framework derived from a printed circuit board (PCB) or a printed wire board (PWB) manufactured by a conventional technique. Insulating materials for use with the circuit board of the present invention include fiberglass boards, non-woven fabric, and various resins. Electrically conductive materials for use with the circuit board of the present invention include copper foil. Wirings are formed inside the circuit board or on the surfaces of the circuit board by the prior art, such as photoresist, development, etching, and electroplating. In this embodiment, the circuit board 120 is a single double-sided board. In another embodiment, the circuit board 120 consists of stacked multiple double-sided boards or multilayer boards. The circuit board 120 has multiple cavities 122 which penetrate the circuit board 120 longitudinally. The cavities 122 contain the magnetic rotors 130, respectively.

Referring to FIG. 1A and FIG. 1B, the magnetic rotors 130 each comprise a rotating shaft (not shown), a bearing (not shown, fixed to the bottom of the casing) connected to the rotating shaft, and a permanent magnet 133 connected to the rotating shaft. In this embodiment, the permanent magnets 133 of the magnetic rotors 130 are inserted into the cavity 122 of the circuit board 120, respectively. The permanent magnets 133 are made of aluminum-nickel-cobalt alloy, neodymium-iron-boron (Nd—Fe—B) magnet, or any material which can retain magnetism for a long period of time and is unlikely to be magnetized, and their size ranges from millimeters to centimeters, preferably from 0.5 mm to 3 cm.

Referring to FIG. 1A and FIG. 1B, the ring-shaped stators S1 each comprise a magnet component F1 and a winding unit C1. The ring-shaped stators S1 are integrated into the circuit board 120 physically. In this embodiment, the magnet components F1 are made of a material which senses magnetism under a magnetic force. For example, an amorphous magnetically permeable material is printed on an appropriate carrier, or an amorphous magnetically permeable plate undergoes a processing process, such as etching. In this embodiment, the magnet components F1 are ring-shape and are embedded in the circuit board 120 and disposed on the horizontal edges of the cavity 122 to surround the magnetic rotors 130 in the cavity 122, respectively. Referring to FIG. 1B, the magnet component F1 further comprises the protruding portions T1 which point at the magnetic rotor 130. The protruding portions T1 are in the number of three, six or nine or in any other appropriate number. This embodiment is exemplified by six protruding portions, but the present invention is not limited thereto. Preferably, the magnet components F1 have dimensions which range from millimeters to centimeters and thickness which ranges from 0.05 mm to 0.5 mm.

Referring to FIG. 2, in the circuit board 120, the 21 micro-conversion units are arranged in a matrix on the planar surface of the circuit board 121. The quantity of the micro-conversion units 100' of the planar energy conversion device 100 is subject to changes as needed and thus is not limited to the disclosure of the embodiments.

It is feasible that the planar energy conversion device 100 is designed to be an electric generator, and thus each micro-conversion unit is a micro-power-generating unit for generating a rated power which ranges from milliwatts to tens of watts. Therefore, the total rated power of energy conversion of the planar energy conversion device 100 correlates with the quantity of micro-conversion units. The magnetic rotor of each micro-conversion device is rotated by hand, with any fluid, or by any other appropriate driving force to actuate power generation. In an embodiment of electric generator, the permanent magnet 133 is provided in the form of a permanent magnetic fan. The permanent magnetic fan is the permanent magnet 133 that comes with vanes. The vanes are micro-mechanical electrocast magnetic bodies which underwent SN polarized magnetism treatment. The vanes have permanent S-pole magnetism or N-pole magnetism. The permanent magnetic fan rotates when driven directly by a fluid, such as water, wind, and any other external force. In an embodiment where the permanent magnetic fan functions as the planar energy conversion device 100 of the permanent magnet 133, an inlet and an outlet are disposed on the casing of the permanent magnetic fan to admit and discharge a fluid and adapted to guide an augmented fluid through every cavity 122. Therefore, the planar energy conversion device 100 is placed in a point of convection of a fluid, such flowing air or flowing water. When a fluid drives the permanent magnet 133 to rotate, magnetism of the protruding portions of the magnet component F1 undergoes an induced change in response to the rotation of the poles NS of the permanent magnet 133 so that the wiring of each winding unit C1 generates a current. Referring to FIG. 2, each micro-conversion unit 100' on the circuit board 120 generates a current whenever the magnetic rotor 130 is driven to rotate under a force. A rectification component for converting an alternating current into a direct current is disposed in the circuit board 120, and it is also feasible that the circuit board comes with any other circuit design whereby currents generated from the micro-conversion units 100' are collected in a series-connected or parallel-connected manner. The planar energy conversion device 100 is disposed beside a heat-dissipating fan of a host computer so that a wind, which is generated as a result of heat dissipation, actuates the planar energy conversion device 100 to produce currents which range from microamperes to milliamperes. The planar energy conversion device 100 further comprises an alternating current socket or a USB connector for charging an electronic product or transmitting power to a load. In a variant embodiment, the planar energy conversion device 100 is integrated into a conventional power storage device to enable the power storage device to not only store conventional power but also generate power independently.

Figure 3:
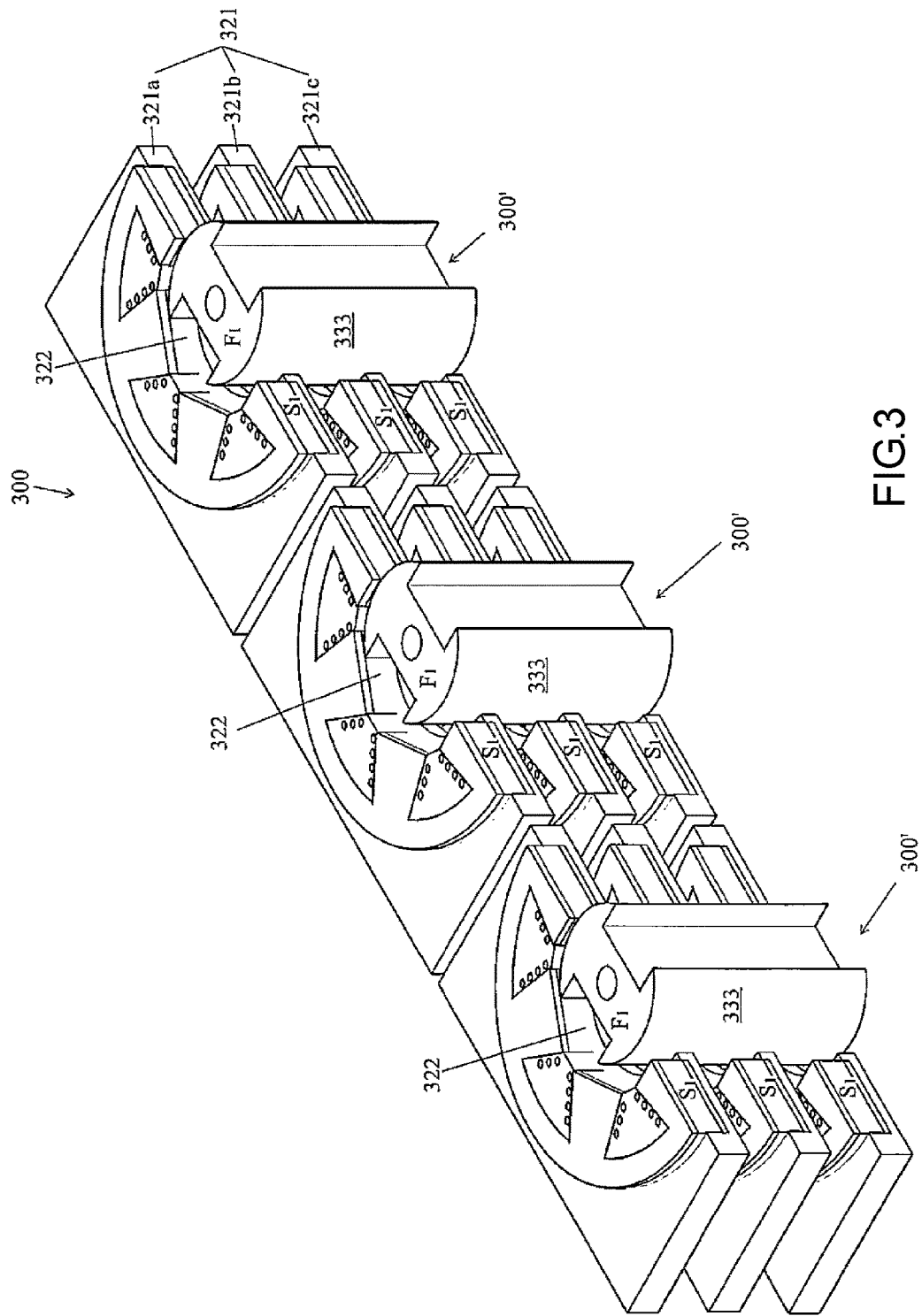
FIG. 3 is a cutaway view of part of the structure of the planar energy conversion device according to the second embodiment of the present invention.

In the first embodiment, each micro-conversion unit 100' of the planar energy conversion device comprises a ring-shaped stator S1 integrated into a double-sided board. Referring to FIG. 3, in the second embodiment, the planar energy conversion device 300 comprises a circuit board 321 composed of three double-sided boards 321a, 321b and 321c. From the perspective of each micro-conversion unit 300', since each double-sided board has a ring-shaped stator S1, each micro-conversion unit 300' comprises three ring-shaped stators S1 corresponding in position to the same magnetic rotor 333. The three ring-shaped stators S1 stack in the vertical direction of cavity 322. The quantity of the ring-shaped stators S1 is illustrated rather than restricted above, as the present invention is not restrictive of the quantity of the ring-shaped stators S1. Like the first embodiment, the second embodiment is characterized in that the ring-shaped stator S1 comprises the magnet component F1 and the winding unit C1, but FIG. 3 does not show the winding unit C1 for the sake of brevity.

In another embodiment (not shown) of a planar energy conversion device which functions as an electric generator, the permanent magnet 133 dispenses with any fan, and the planar energy conversion device further comprises a plurality of fans connected to the permanent magnets 133 through rotating shafts, respectively. Instead of being disposed in cavities, the fans extend outward to protrude out of the circuit board together with the rotating shafts connected to the permanent magnet 133. The aforesaid design allows each fan to be positioned closer to an inlet of a fluid and thus subjected to a force more extensively.

Figure 4:
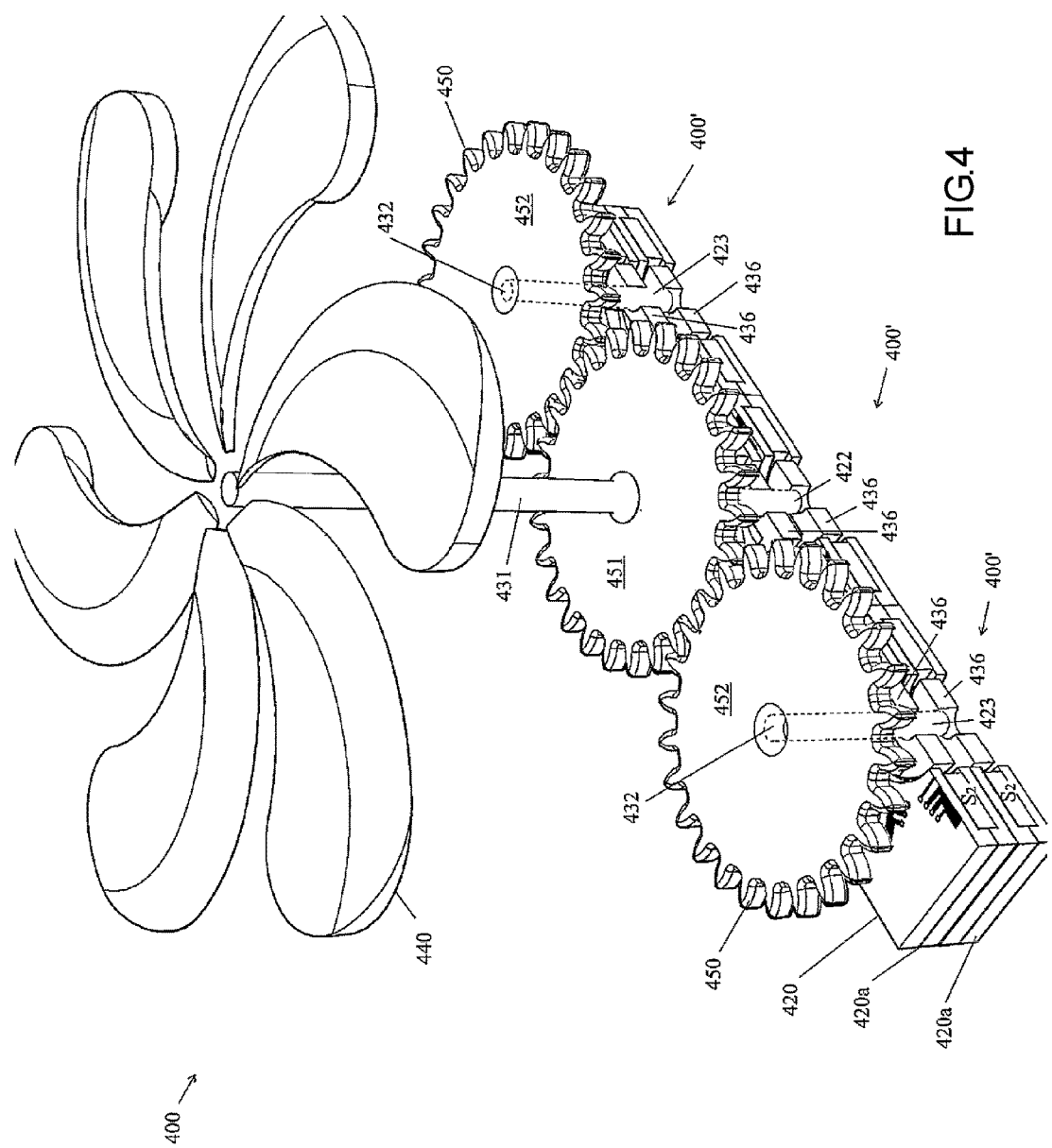
FIG. 4 is a cutaway view of part of the structure of the planar energy conversion device according to the third embodiment of the present invention.

FIG. 4 shows the framework of a planar energy conversion device 400 according to the third embodiment of the present invention. In this embodiment, the planar energy conversion device 400 is an electric generator. Referring to FIG. 4, the planar energy conversion device 400 comprises a circuit board 420, a gear unit 450, and a fan 440 disposed in a casing (not shown). For the sake of clarity, only a half of the circuit board 420 is shown in FIG. 4. The circuit board 420 has two planar double-sided boards 420a stacked longitudinally. Although this embodiment is exemplified by only two double-sided boards, the present invention is not limited thereto. In another embodiment, the double-sided boards 420a are in the number of one, three or in any other appropriate number. The double-sided boards 420a each comprise at least one first cavity 422 and two second cavities 423. The cavities 422/423 correspond in position to micro-conversion units 400', respectively. FIG. 4 shows three micro-conversion units 400'. The micro-conversion units 400' each comprise two magnetic rotors 436 stacked up and disposed in the cavities, respectively. The two ring-shaped stators S2 stack and surround the magnetic rotors 436. The ring-shaped stator S2 is integrated into the circuit board 420. This embodiment is exemplified by a casing 410, a circuit board 420, various components of the micro-conversion units 400', and materials they are made of; in this regard, this embodiment is similar to the preceding embodiments and thus is not described hereunder for the sake of brevity.

Referring to FIG. 4, the planar energy conversion device 400 comprises the gear unit 450 for connecting the magnetic rotors 436 in the first cavity 422 and the magnetic rotors 436 in the second cavities 423. The gear unit 450 rotates the magnetic rotors 436 in the first cavity 422 to thereby drive the magnetic rotors 436 in the second cavities 423 to rotate. The magnetic rotors 436 in the first cavity 422 are each connected to a first rotating shaft 431. The magnetic rotors 436 in the second cavities 423 are each connected to a second rotating shaft 432 (indicated by a dashed line.) The gear unit 450 connects the first rotating shaft 431 and the second rotating shaft 432. The gear unit 450 rotates about the first rotating shaft 431. The fan 440 connects with the first rotating shaft 431. The first rotating shaft 431 penetrates the circuit board 420 such that the fan 440 protrudes from the circuit board 420. The aforesaid components of the planar energy conversion device 400 are disposed in a casing, and the casing has an inlet and an outlet whereby a fluid enters and exits the casing to guide an augmented fluid through the fan 440. Rotation of the fan 440 not only causes the magnetic rotors 436 in the first cavity 422 to rotate but also causes the magnetic rotors 436 in the second cavities 423 to rotate through the gear unit 450. The fan 450 rotates to drive each micro-conversion unit 400' through the first rotating shaft 431, the gear unit 450 and the second rotating shaft 432. A rectification component for converting an alternating current into a direct current is disposed in the circuit board 420, and it is also feasible that the circuit board comes with any other circuit design whereby currents generated from the winding units are collected in a series-connected or parallel-connected manner.

Referring to FIG. 4, the gear unit 450 has at least one first gear 451 and two second gears 452 which mesh with the first gear 451. The first gear 451 is connected to the magnetic rotors 436 in the first cavity 422 and the fan 440 through the first rotating shaft 431. The second gears 452 are connected to the magnetic rotors 436 in the second cavities 423 through the second rotating shaft 432. This embodiment is exemplified by a 1:1 radius ratio of the first gear 451 to the second gears 452. The quantity of the second gears 452 depends on a predetermined gear ratio and position and is not restricted by this embodiment. Persons skilled in the art can determine the frequency of the current output of each micro-conversion unit 400' according to the gear ratio (i.e., the quotient obtained by dividing the number of teeth of a large gear by the number of teeth of a small gear.)

In the third embodiment, the planar energy conversion device 400 has only one said fan 440. Rotation of the fan 440 not only actuates the micro-conversion unit 400' which has the same axis as the fan 440 but also actuates through the gear unit 450 any other micro-conversion unit 400' which does not rotate about the same axis as the fan 440. In a variant embodiment (not shown), each micro-conversion unit 400' has its own fan which operates independently. Hence, the planar energy conversion device of the present invention further comprises a plurality of fans connected to the micro-conversion units corresponding in position thereto, respectively.

In addition, also functioning as an electric generator, the present invention further includes a variant embodiment in which the fan 440 of the third embodiment is modified to serve as a conventional rotator. The rotator connects with any other rotating devices, such as shafts of wheels of a bicycle, so that the kinetic energy of the bicycle in motion is converted into electrical energy by the planar energy conversion device of the present invention.

Figure 5:
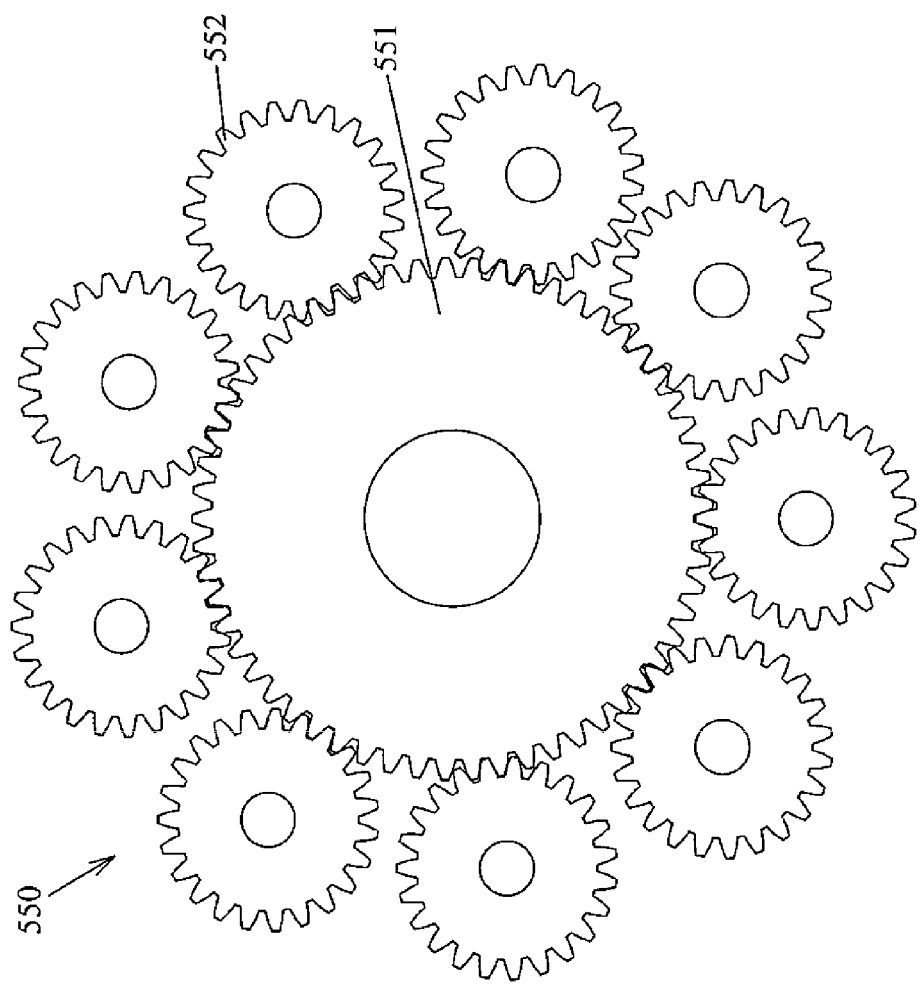
FIG. 5 is a top view of a gear unit of the planar energy conversion device according to the fourth embodiment of the present invention.

A gear unit of the planar energy conversion device of the present invention is subject to changes. In the third embodiment, the gear unit 450 of the planar energy conversion device is exemplified in that one first gear 451 and two second gears 452 are arranged in a row. FIG. 5 and FIG. 6 show a planar energy conversion device 500 according to the fourth embodiment of the present invention. Referring to FIG. 5, in the fourth embodiment, a gear unit 550 comprises one first gear 551 and nine second gears 552 which mesh with the first gear 551. The nine second gears 552 surround the centrally-located first gear 551. The third embodiment is similar to the preceding embodiments in that the gears correspond in position to the micro-conversion units, respectively. FIG. 5 does not show components of the planar energy conversion device of the fourth embodiment, except for the gear unit 550, but the fourth embodiment is basically similar to the third embodiment in terms of the aforesaid structures. The quantity of the second gears 552 depends on the gear ratio of the first gear and the position thereof and is not restricted by this embodiment. Persons skilled in the art can determine the frequency of the current output of each micro-conversion unit according to the gear ratio (i.e., the quotient obtained by dividing the number of teeth of a large gear by the number of teeth of a small gear.) To enable persons skilled in the art to gain insight into the fourth embodiment, part of the structure of the planar energy conversion device 500 of the fourth embodiment is illustrated with FIG. 6. Referring to FIG. 6, the planar energy conversion device 500 of the fourth embodiment comprises a fan 540, a first gear 551, a first rotating shaft 531 and a micro-conversion unit 500'. FIG. 6 does not show the second gears 552 and the micro-conversion units corresponding in position thereto, respectively.

In the aforesaid embodiments of the present invention, the magnetic rotors are exemplified by permanent magnets, whereas the magnet component of the ring-shaped stator is exemplified by an induction magnet. However, the present invention also includes a variant embodiment, wherein the magnetic rotors are induction magnets, whereas the magnet component of the ring-shaped stator is exemplified by a permanent magnet.

The planar energy conversion device of the present invention is advantageously lightweight, delicate and portable and thus versatile. Take an electric generator as an example, it is disposed in a host computer to function as a relay power charger, because a heat-dissipating fan of the host produces a wind to generate power. Since it is advantageously compact and portable, the electric generator functioning as a relay power charger during a charging session is placed at wherever a flowing fluid, such as a wind, drives the fan to rotate, for example, at a casing of a means of transport in motion, a window, a balcony, or a jogger's arm. The planar energy conversion device of the present invention further comprises a waterproofing mechanism or has its casing fully embodying a drainage design to thereby keep the power generating zone operating in a dry environment while only the fan is being exposed in order to be in contact with flowing water. Furthermore, it can be placed in a fountain, an artificial waterfall or any flowing liquid to generate hydropower. The power stored in the planar energy conversion device of the present invention can substitute for a conventional small-sized battery or can be used to charge a mobile phone at any time. Commercially available power relay devices in operation must be connected to an external power source or battery and are incapable of wind power generation or relaying. Therefore, the power relay device can be equipped with the planar energy conversion device of the present invention in order to make good use of natural kinetic resources and meet the needs for green environmental protection. The planar energy conversion device of the present invention can be covered with sound-absorbing cotton or enclosed with a casing so as to reduce the noise generated from the fan or gears. To preclude electromagnetic waves, the planar energy conversion device of the present invention can be designed to adsorb or ground electromagnetic waves. To prevent damage otherwise caused by overheating during the process of power generation, parts and components of the planar energy conversion device of the present invention are made of flame retardant materials. It is feasible that the circuit board comes with a thermostat breaker, an air blast cooling mechanism, refrigeration mechanism, or ice watering mechanism. To prevent damage otherwise caused by a cold environment, the planar energy conversion device of the present invention is equipped with an IR heating lamp or a de-icing temperature regulation mechanism. In addition to power generation, the planar energy conversion device of the present invention is capable of heating; for example, a gas passing through the planar energy conversion device of the present invention is collected and delivered indoors through an air filter in order to be used in heating, because the gas is heated up with the heat generated from the process of power generation.

As mentioned before, electric generators differ from electric motors in a basic principle, that is, opposite directions of energy conversion. Therefore, the planar energy conversion device of the present invention can also be designed to be an electric motor for converting electrical energy into mechanical energy. The planar energy conversion device is hereunder exemplified by the aforesaid structures of the first embodiment, wherein a wiring design whereby a current is supplied to the micro-conversion units 100' is obtained by modifying the wiring design attributed to a circuit board 120 and otherwise intended for current output for use in power generation so that each micro-conversion unit 100' becomes a micro-electrically-driving unit. Power is appropriately applied to drive a magnetic rotor 130 to rotate. If the magnetic rotor 130 connects with a fan or is a permanent magnetic fan, the micro-conversion units 100' will be able to generate a micro-wind. The fan is replaced with an excited rotor for driving any other component to rotate. The electric motor of the present invention is further applied to any electronic components which require a motor function, for example, a micro-precision-style stepper motor, and are crucial parts and components of a digital camera, digital camcorder, business card scanner, CD-ROM, and DVD-ROM.

Although the present invention is disclosed above by preferred embodiments, the present invention covers many other embodiments described by the claims of the present invention. Equivalent changes and modifications made to the embodiments of the present invention without departing from the spirit of the present invention must be covered by the appended claims.

The invention claimed is:

1. A planar energy conversion device with a plurality of micro-conversion units, comprising:
a carrier comprising horizontally arranged cavities corresponding in position to the micro-conversion units, respectively, the micro-conversion units each comprising:
a magnetic rotor disposed in a corresponding one of the cavities; and
at least one ring-shaped stator surrounding the magnetic rotor, being integrated into the carrier, and comprising a magnet component and a winding unit, wherein the magnet component is fully embedded in the carrier and has multiple protruding portions arranged along an edge of the cavity horizontally, and the winding unit has multiple winding elements corresponding in position to the protruding portions, respectively.

2. The planar energy conversion device of claim 1, wherein the winding elements each comprise an upper wiring layer and a lower wiring layer which are formed on the carrier and at least one conductive through hole for connecting the upper wiring layer and the lower wiring layer, so as for the winding elements to wind around the magnet components corresponding in position to the winding elements, respectively.

3. The planar energy conversion device of claim 1, wherein the magnetic rotor has vanes with one of permanent S-pole magnetism and permanent N-pole magnetism.

4. The planar energy conversion device of claim 1, wherein each micro-conversion unit comprises multiple ring-shaped stators corresponding in position to a same magnetic rotor, the multiple ring-shaped stators stacking in a vertical direction of the cavities and being integrated into the carrier.

5. The planar energy conversion device of claim 1, wherein the planar energy conversion device is one of an electric generator and an electric motor.

6. A power storage device, comprising the planar energy conversion device of claim 1.

7. A means of transport, comprising the planar energy conversion device of claim 1.

8. A power relay device, comprising the planar energy conversion device of claim 1.

9. A heating system, comprising the planar energy conversion device of claim 1.

10. A planar energy conversion device with a plurality of micro-conversion units, comprising:
a carrier and a gear unit, the carrier comprising at least one first cavity and multiple second cavities, each cavity corresponding in position to a corresponding one of the micro-conversion units, each micro-conversion unit comprising:
a magnetic rotor disposed in a corresponding one of the cavities; and
at least one ring-shaped stator surrounding the magnetic rotor, being integrated into the carrier, and comprising a magnet component and a winding unit, wherein the magnet component is fully embedded in the carrier and has multiple protruding portions arranged along an edge of the cavity horizontally, and the winding unit has multiple winding elements corresponding in position to the protruding portions, respectively,
wherein the gear unit connects the magnetic rotor in the first cavity and the magnetic rotors in the second cavities, and the gear unit rotates the magnetic rotor in the first cavity to thereby drive the magnetic rotors in the second cavities.

11. The planar energy conversion device of claim 10, wherein the gear unit has at least one first gear and a plurality of second gears surrounding the first gear such that the second gears mesh with the first gear, wherein the first gear is connected to the magnetic rotor in the first cavity through a first rotating shaft, and the second gears are connected to the magnetic rotors in the second cavities through second rotating shafts.

12. The planar energy conversion device of claim 11, wherein the first gear and the plurality of second gears are disposed above the carrier and arranged horizontally along an upper surface of the carrier.

13. The planar energy conversion device of claim 10, further comprising at least one fan connected to the magnetic rotor in the first cavity.

14. The planar energy conversion device of claim 10, wherein the multiple second cavities arranged in a manner to surround the first cavity.

15. A power storage device, comprising the planar energy conversion device of claim 10.

16. A means of transport, comprising the planar energy conversion device of any claim 10.

17. A power relay device, comprising the planar energy conversion device of claim 10.

18. A heating system, comprising the planar energy conversion device of claim 10.

* * * * *